United States Patent [19]
Kinkead et al.

[11] 4,071,152
[45] Jan. 31, 1978

[54] WHEELCHAIR LIFT FOR PUBLIC TRANSPORTATION VEHICLE

[75] Inventors: Jordan A. Kinkead, Atherton; James T. Pott, Palo Alto; Roger M. Sherman, Los Gatos; Eugene F. Sullivan, San Jose, all of Calif.

[73] Assignee: County of Santa Clara, State of California, San Jose, Calif.

[21] Appl. No.: 750,205

[22] Filed: Dec. 13, 1976

[51] Int. Cl.[2] .......... B60P 1/44
[52] U.S. Cl. .......... 214/75 R; 214/75 G; 214/671; 214/730
[58] Field of Search .......... 214/75 R, 75 T, 75 H, 214/75 G, 730, 671, 660, 77 R

[56] References Cited

U.S. PATENT DOCUMENTS

| | | | |
|---|---|---|---|
| 747,899 | 12/1903 | Wall | 214/75 T |
| 3,216,598 | 11/1965 | McKee et al. | 214/730 |
| 3,516,559 | 6/1970 | Walter | 214/75 R |
| 3,847,292 | 11/1974 | Williams et al. | 214/75 G |
| 3,893,576 | 7/1975 | Casady | 214/75 R |
| 4,026,387 | 5/1977 | Abreu | 214/75 T |

*Primary Examiner*—Lawrence J. Oresky
*Attorney, Agent, or Firm*—Gerald L. Moore

[57] ABSTRACT

A lift for use in a public conveyance such as a bus, train, et cetera, such that a wheelchair can be rolled onto the lift platform at ground level and be transported into the vehicle. The lift platform moves vertically in a well in the vehicle to the passenger level and then rotates into the bus as the doors are closed. Exit from the vehicle is accomplished in the reverse manner.

17 Claims, 12 Drawing Figures

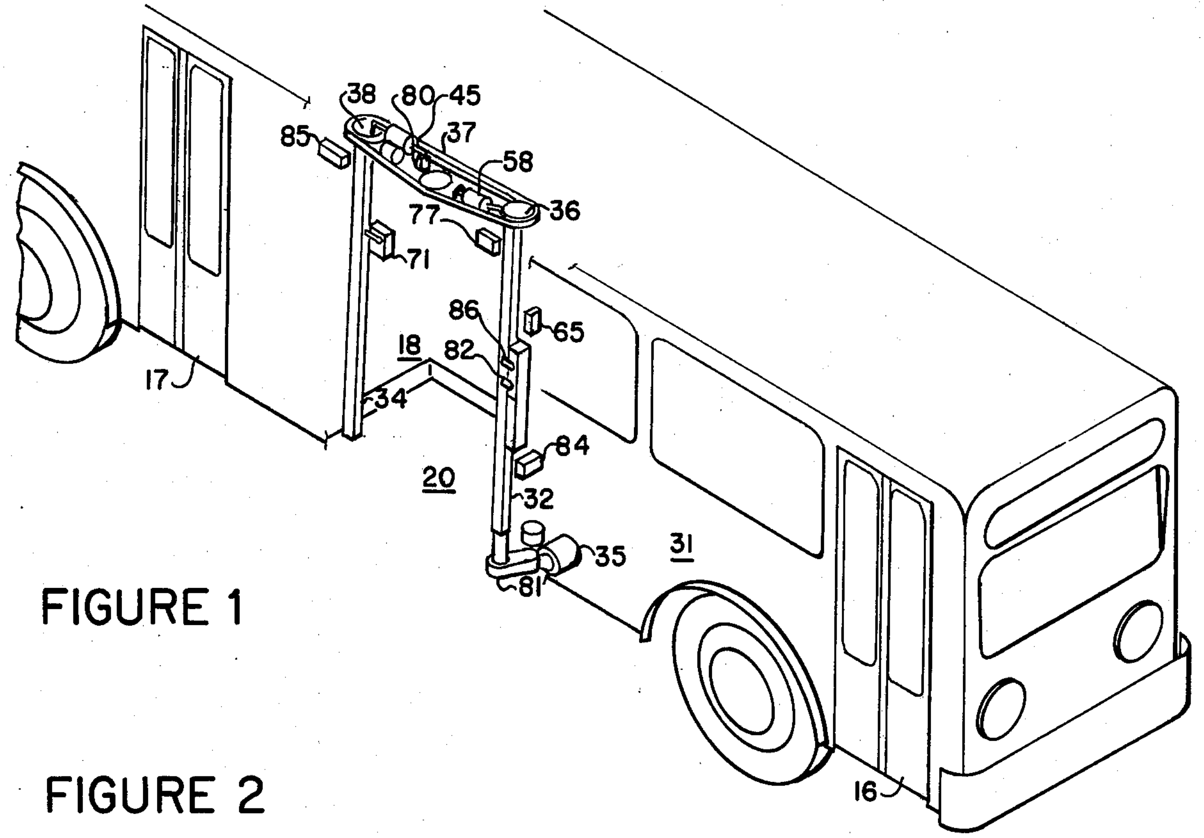
FIGURE 1
FIGURE 2
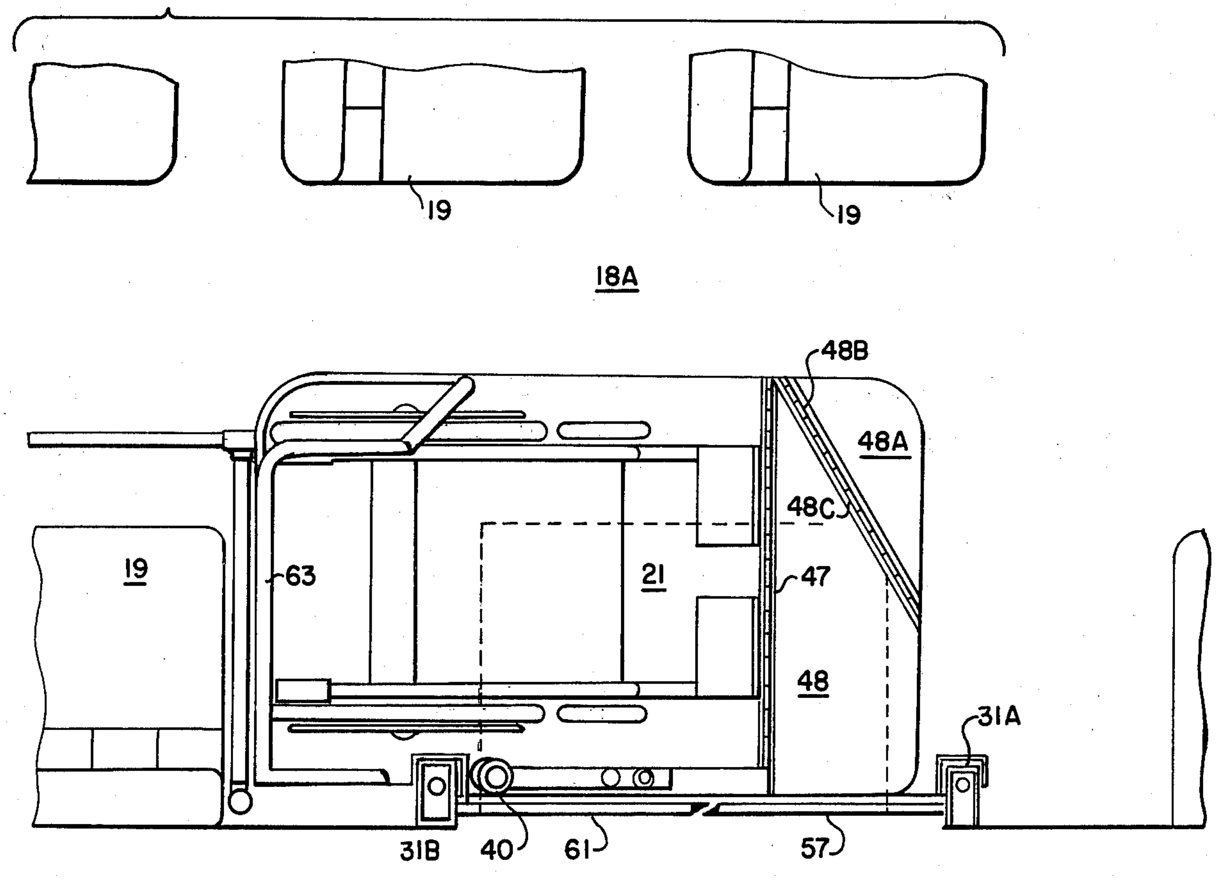

WHEELCHAIR LIFT FOR PUBLIC TRANSPORTATION VEHICLE

BACKGROUND OF THE INVENTION

To assist disabled persons in boarding public conveyances such as buses, there have been devised various means for boarding. Of course a present means is to use a folding wheelchair but this manner of boarding requires that the disabled person be able to proceed up the steps and frequently the person cannot walk. In addition, persons walking on crutches or with a cane frequently are unable to maneuver the steps of a public bus. As a result there have been devised various lifts which raise the person to the passenger level in the bus.

Preferably such lifts allow the passenger to board a platform at the sidewalk level and be raised to the passenger level. In addition the less maneuvering the passenger has to effect in boarding and dismounting from the lift the better. Such is true because during such boarding the passenger is subjected to unfamiliar surroundings and moveable mechanisms and as a result, may not be able to maneuver in the best manner, whether on crutches or in a wheelchair.

In addition, it is important that such a lift occupy as little space as possible in the bus because such space is subtracted from the passenger capacity and may not be used most of the time. The weight and complexity of such mechanisms also are important because of economy and maintenance problems. Also not the least of considerations in the use of such lifts, are safety considerations such as safety to the passenger using the lift and also the safety of other passengers in being protected from the lift mechanism and also being guarded against falling into the lift well when the platform is operating or in the lowered position. Of course there are other safety considerations such as locking the mechanism against operation while the bus in in motion and enabling the user to stop the mechanism if trouble arises. In addition, such lifts must be capable of being lowered to different heights and still operate conveniently because sidewalks and curbs are of varying heights relative to the street level.

In the past one lift mechanism used involved a platform which could be raised and lowered but also which folded to a vertical position when in the raised position to permit closing of the vehicle doors. In this type of mechanism the passenger boards the platform at the lowered position, is raised to the passenger level and thereafter must leave the platform before it can be folded upward for storage to allow for closing the doors. When disembarking the passenger must wait in the aisle for the platform to fold down to the horizontal position, board the platform and thereafter be lowered to street level.

One problem which immediately arises in the use of this previously-used lift is the time necessary for boarding and discharging disabled persons. In each instance the disabled passenger had to leave the platform after being raised to the passenger level prior to the platform being folded for closing the doors. When departing the passenger must await the folding down of the platform and then maneuver thereon prior to being lowered to ground level.

Not only does such action take additional time during which the bus must be standing still, but additionally the person disembarking is required to maneuver onto the raised platform while the doors are open. While guard rails can be provided, still there can be a concern on the part of the person for his safety because such maneuvering is required at an elevated position.

In addition while the lift is lowered to the street level position the other passengers must be protected against falling into the well created by the lowered platform. While guard rails can be provided, still these guard rails must be swung out of position when the platform is at passenger level to allow movement of the disabled person onto and from the platform. The maneuvering of such guard devices must always be accomplished without exposing the passengers to additional hazards.

In addition there are times that there is limited side clearance between the conveyance and obstructions at the loading place. For instance with buses, there may be signs, trees, et cetera, near the loading zone which limit the space in which the lift can be operated.

Thus it can be seen that the provision of a platform for lifting disabled persons into a public conveyance such as a bus presents various problems of design, operation and safety. It is the purpose of this invention to provide such a lift which is convenient to use yet is compact, safe and efficient in design.

SUMMARY OF THE INVENTION

A lift mechanism for a vehicle to transport a disabled person between ground level and the vehicle passenger level within a lift well provided in the vehicle. The mechanism comprises a platform on which the disabled person can ride, a support for mounting the platform for rotation from a position in alignment with the vehicle seats to a position facing out the side and extending normal to the forward direction of the vehicle. The support is moved vertically within the well to move the platform from the passenger level to ground level. Doors mounted on the vehicle are positioned to open for exposing the lift well and platform to the outside of the vehicle to enable the platform to rotate on the support.

DESCRIPTION OF THE DRAWINGS

FIG. 1 is a perspective view of a passenger bus having the subject invention incorporated therein and showing a portion of the operating mechanism;

FIG. 2 is an enlarged top plan view of the lift mechanism and a portion of the vehicle;

DESCRIPTION OF THE INVENTION

Figure 5:
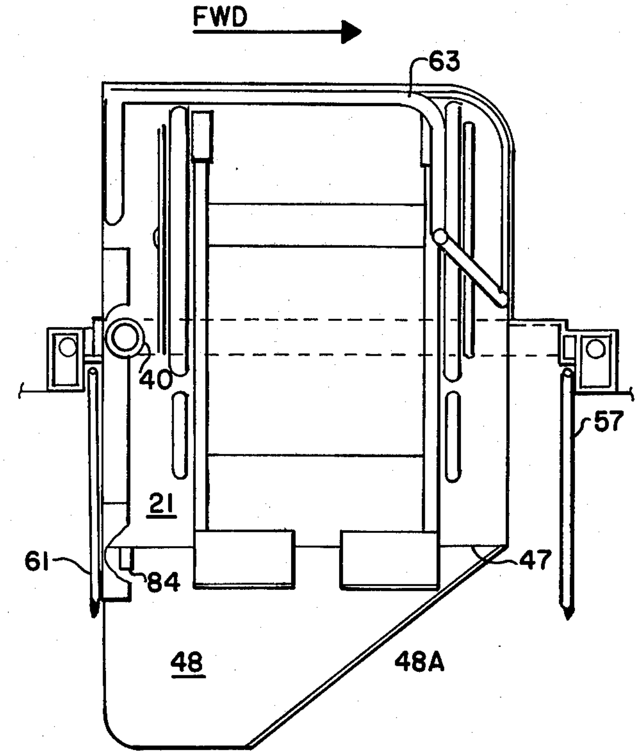
FIG. 5 is a top plan view of the lift appparatus with the platform rotated for vertical actuation.

Shown in FIG. 1 is a public conveyance or passenger bus 15 of the type in which the subject invention can be utilized. In such a conveyance, passengers are generally boarded and discharged through the front doors 16 and the rear doors 17. Usually there are two or three steps (not shown) which the passengers must climb to reach the floor 18 of the bus representing the passenger level. In addition, because of clearance above ground level, the passenger must step up to the first step from the ground or curb. Thereafter the passenger passes along a center aisle 18A to take a position at one of the seats 19 (FIG. 2) spaced along each side in the bus. Naturally it is extremely difficult or impossible for a disabled person in a wheelchair or walking with crutches or a cane to board and disembark from the bus because of the necessity for climbing up and down the steps. While the present invention is described for use in a passenger bus, it should be remembered that the same problems exist with respect to other passenger conveyances such as trains, and the invention can just as well be incorporated in such other conveyances.

In accordance with the present invention, there is provided a lift for incorporation into a bus, which lift can be actuated to move a platform between the passenger level and ground level. The lift is of sufficient size to carry a disabled person in a wheelchair, both motorized and handpowered, or a person on crutches who might otherwise have difficulty in climbing the steps into the bus. In addition a fold-down seat (not shown) can be provided so walking persons can sit during movement of the platform. The lift is incorporated in the bus in a manner to occupy a minimum amount of space and so as not to interfere with the normal ingress and egress of the able passengers. In addition the lift incorporates certain safety features to assure effective operation at varying ground heights and to enable control by the user.

As shown in FIG. 1, the bus 15 is modified to form a well 20 in the side thereof sufficiently large to accommodate a wheelchair and passenger. Positioned in this well is a platform 21 which is moved vertically between the passenger level wherein the surface of the platform is substantially aligned with the plane of the floor 18 of the bus and a ground level position from which the passenger can board the platform by rolling onto it in a wheelchair. In addition the platform is supported in a manner to permit rotation from a position wherein it can be boarded from the side of the bus to a position wherein the passenger can move off it into the bus in a direction parallel to the forward direction in the bus. Furthermore the platform is actuated so the passenger can merely sit still after rolling onto it and move with the platform to a position within the bus with the doors closed and the bus prepared to move on to the next station. Thereafter the passenger can either remain on the platform or move off it to another position in the bus.

Figure 4:
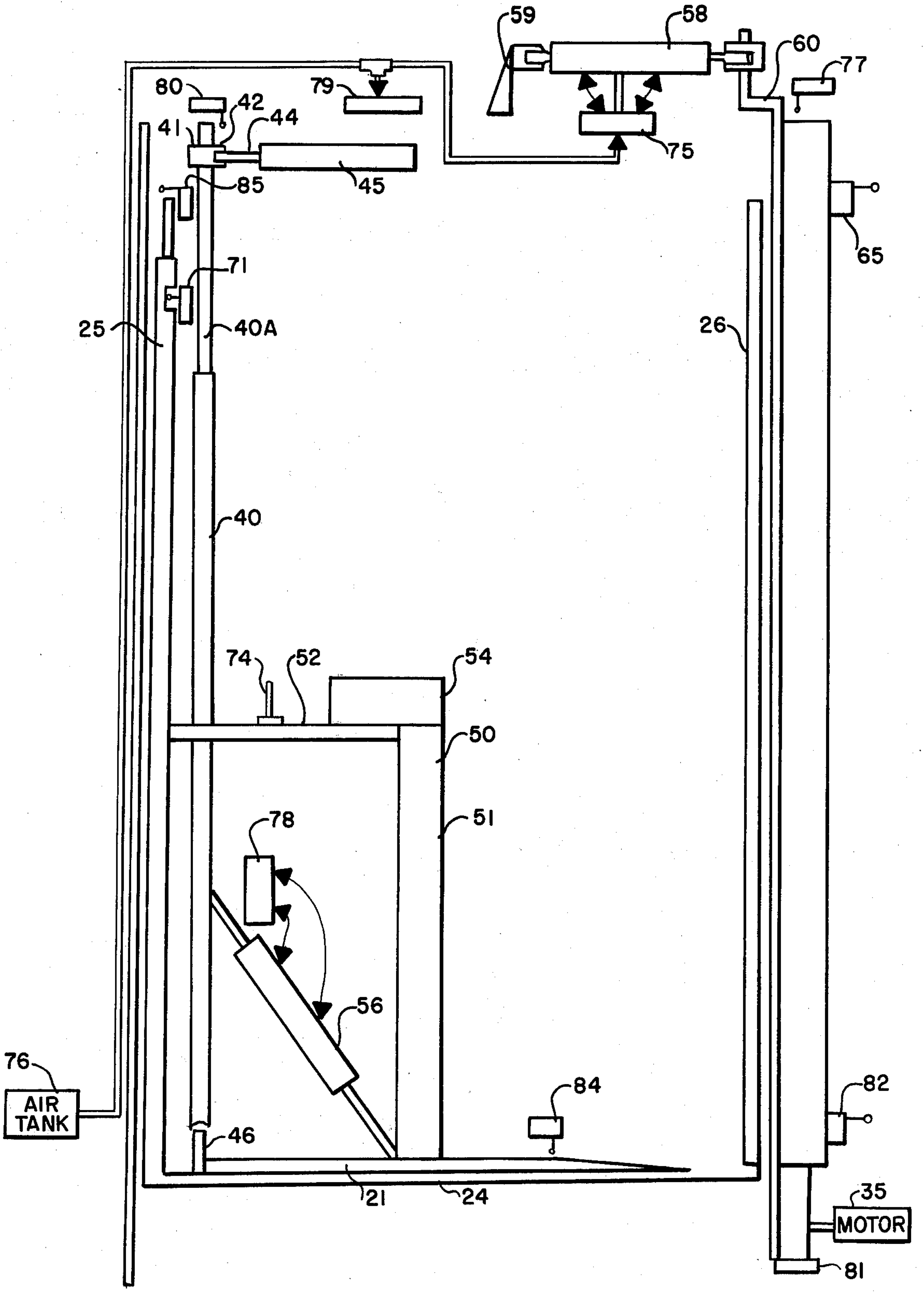
FIG. 4 is a side elevation view in enlarged detail of the lift apparatus in the bus.

The platform is mounted on a U-shaped support 24 shown primarily in FIG. 4, having upstanding side extensions 25 and 26 joined at their lower ends to the support 24. Fixed to each of the side extensions preferably by bolts 27 (FIG. 8) is a support arm 28 fixed to a sleeve 29. The sleeve forms a hollow cylindrical opening 30 having the axis thereof extending vertically.

For raising and lowering the support 24 and the mounted platform 21, there is positioned to each side of the well in the outer wall 31 of the bus a pair of vertically extending threaded or ball screw shafts 32 and 34 (FIG. 1) journaled at the top and bottom ends. The drive shaft 32 is powered by a motor 35 preferably positioned beneath the frame of the bus, which motor rotates the shaft 32 selectively in both directions. This motor and other actuators can be driven electrically from the bus electrical system or be powered hydraulically or by air from a system driven by the bus. Fixed to the upper end of the shaft is a sprocket or pulley 36 which drives a chain or timing belt 37 extending horizontally to another sprocket 38 fixed to the upper end of the threaded shaft 34. Thus by rotation of the shaft 32, the shaft 34 is also rotated and synchronism is maintained between the shafts by the positive drive of the belt 37.

Threaded onto each shaft is a ball nut 39 which is mounted to prevent rotation with the shaft but which is moved vertically up or down depending upon the direction of rotation of the shaft. The ball nuts 39A and 39B mounted on the threaded shafts 32 and 34 respectively are fitted below the support arm 28 fixed to each of the side extensions 25 and 26 with the threaded shafts passing through the opening 30 of the sleeve 29. Thus as the ball nuts are moved in the vertical direction with rotation of the drive shafts, the extensions 25 and 26 are also shifted vertically therewith to carry with them the support 24. It can therefore be seen that the driving motor 35 causes vertical actuation of the support 24 between the passenger level position and the ground level position previously described.

As shown primarily in FIG. 4, the platform 21 has mounted thereon a pipe or torque tube 40 fixed at the lower end to the platform 21. A pipe 40A telescopes in the pipe 40 and is journaled at the upper end in a bearing 41. The pipe 40A includes a squared portion (not shown) which prevents relative rotation between the pipes 40 and 40A. Fixed to the upper end of this tube is a lever 42 to which is attached the shaft 44 of an actuator or air cylinder 45. The air cylinder preferably is fixed to the bus body at a position above the side opening in the bus forming the well 20. The bottom end of the pipe 40 attached to the platform fits over a stud 46 fixed to the support 24 and in alignment with the center axis of the pipe.

Figure 3:
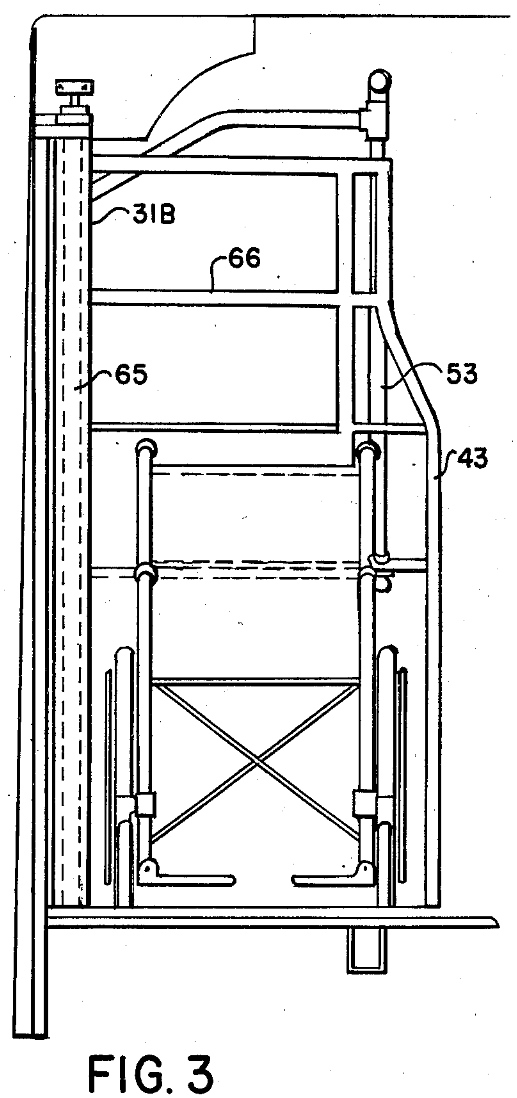
FIG. 3 is a front elevation view of the lift apparatus.

By energization of the actuator 45, the pipes 40 and 40A can be turned to rotate the platform 21. The platform is rotated between the positions shown in FIGS. 2 and 3 completely within the bus (stowed position) to the position shown in FIG. 5 turned 90° such that the normally forward edge 47 faces outward in a direction normal to the side 31 of the bus (boarding position). The center of rotation of the platform is the stud 46 which allows relative movement in the hoizontal plane between the platform 21 and the support 24. The purpose of the vertical movement and rotation of the platform is to enable the transport of the wheelchair and disabled person from a position external to the vehicle and on the ground to a position within the bus as shown in FIG. 2 with the side doors closed and the bus ready to proceed on. In addition, the disabled person is permitted while the bus is in transit to move onto the platform to prepare for departing. After the bus is stopped, the platform carrying the person is rotated to a position facing outward and then lowered to ground level so the person can disembark.

It is necessary to guard against the rolling of the wheelchair during rotation and vertical movement of the platform. It is also necessary to provide a relatively thin edge over which the wheelchair can be maneuvered either from the floor of the bus onto the platform or from the ground onto the platform. For these purposes there is provided a ramp 48 and a flap 48A. The ramp is fixed to the front edge 47 of the platform. The flap is fixed to the ramp and is triangular in configuration with the front inner corner of the ramp being formed such that this attached flap forms the remaining corner so as to present a rectangular ramp on which the wheelchair can ride up. The flap is fixed to the ramp by a hinge (not shown) and can be turned upward to guard against the rolling of the wheelchair from the platform during actuation and also to provide clearance for the corner of the ramp as the platform is rotated past the bus outer wall. The ramp is fixed to the platform by a hinge so that it will pivot downward approximately 10° to form a runway from the ground onto the platform.

Figure 6:
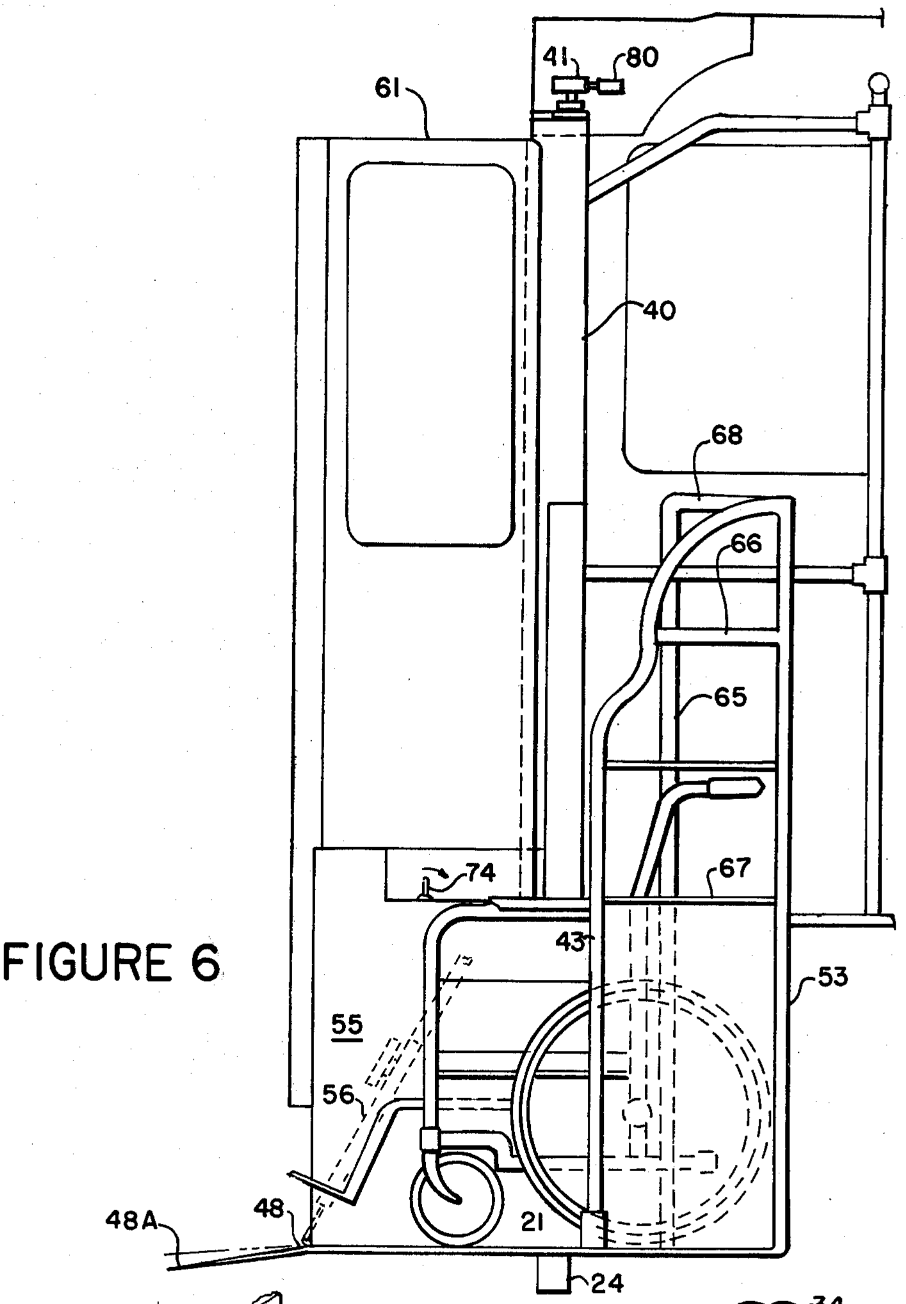
FIG. 6 is a side elevation view of the lift apparatus with the platform lowered to ground level.

As shown in FIGS. 2 and 6, the flap is held by a hinge (not shown) fixed between the edge 48B of the ramp and the edge 48C of the flap. Thus the flap can be actuated from a down position extending substantially in the plane of the platform to an up position extending vertically upward from the plane of the ramp as shown in FIG. 5.

For actuation of the ramp and flap an air cylinder 56 is provided, positioned in a console 50. This console encompasses the pipe 40 and extends upward approximately to the armrest height of a wheelchair. The console is formed of a front upright member 51 and a top plate 52. In addition there is a raised top portion 54 positioned above the upright 51. A side plate 55 presents a smooth surface facing the wheelchair platform. Within the console is the actuator or air cylinder 56 having the cylinder end fixed within the console and the rod end pivotally connected to the ramp 48 and the flap 48A. By energization of this actuator, the flap is moved between the up position and the down position when desired and the ramp is moved approximately 10° between an up position approximately in the plane of the platform top surface and a down position sufficient for the extending edge to rest on the ground.

Thus with the platform at the passenger level position, the ramp and flap are actuated to the downward position to lie flat and in alignment with the floor 18 of the bus permitting easy maneuvering onto and off of the platform which in this position merely forms an extension of the floor. For lowering the platform the ramp and flap are actuated upward bringing the flap to a vertical position to allow the ramp to clear the column 31A housing the drive shaft 32 as the platform is rotated about the stud 46 on the platform support. As can be seen, the position of this axis of rotation for the platform would normally cause the extending edge of the ramp now formed by the flap to encounter the housing 31A forming the corner of the well adjacent the outer bus wall. By raising the flap, this corner is permitted to clear that obstruction during platform rotation. With the flap in the raised position, a wheelchair is prevented from rolling from the platform. Forward movement of the wheelchair will cause it to encounter the raised flap and if forward movement continues, the flap will deflect the wheelchair into the console 50. The wheelchair will not pass between the console and the flap and therefore will be prevented from further forward movement.

Figure 9:
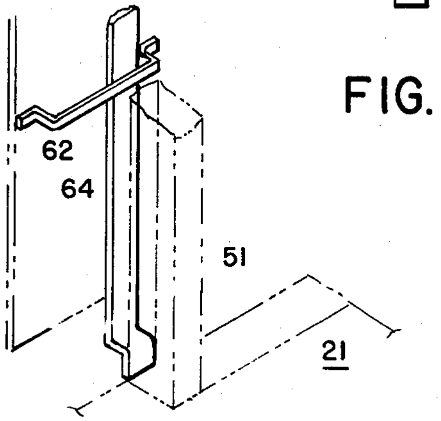
FIG. 9 shows the mechanism for opening the rear door of the vehicle as the platform is rotated.

Prior to actuation of the platform to raise the flap 48 and rotate the platform to the side facing position the forward door 57 is opened. For opening this door there is provided the actuator 58 (FIG. 4) having one end fixed by a bracket 59 to the bus frame and the other end fixed to a crank 60 attached to the door. The door is hinged at the forward edge and by energization of the actuator 58 is swung open to the position illustrated in FIG. 5. For opening the rear door 61 there is fixed thereto a rigid strap 62 (FIG. 9) extending horizontally and attached at both ends to the door. A strap 64 extends vertically and is fixed at both ends to the console. Thus the platform can be moved vertically and the interlocking straps allow relative movement between the console and door. However any rotation of the platform will cause a like rotation of the door, that is, as the platform is swung outward, the rear door is opened by the interlocking straps 62 and 64.

The platform is positioned over the well 20 formed at the side of the bus as shown in FIG. 2. This well is equal in size to that portion of the platform positioned to the left of the post 40 in FIG. 2. To prepare the platform for lowering, it is turned 90° so the rear half of the platform is still positioned within the vehicle in alignment with the well. This positioning provides an enclosure in which the user is raised and lowered thereby providing security to the user during that movement. Also by so positioning the platform less clearance to the side of the bus is necessary making it possible to board and discharge passengers within a smaller area. Because of the necessity of picking up passengers along the streets, the boarding passengers approach such public conveyances from a direction normal to the side of the vehicle, thus making a minimum of side clearance for the operation of the lift an important consideration. So long as the platform is at the passenger level it is positioned above the floor and covers the well 20 such that the passengers can freely move between the center aisle and the platform. When the platform is in this position the ramp 48 and flap 48A are down flush with the floor. With turning and lowering of the platform, this well is exposed and could present a safety hazard to persons on the bus. To guard against anyone falling into the well there is fixed to the platform a rail assembly 63 comprising a plurality of upright bars 43, 53 and 65 joined by intermediate supports 66 and 67 with a crossbar 68 extending at the top. Thus as shown in FIG. 5 with the platform rotated to face outward towards the side of the bus this guard swings around with the platform and serves to prevent the passage of anyone into the lift well. The guard is sufficiently high so as to extend a sufficient distace above the floor even with the platform in the lowered position so as to provide a hand rail for persons standing or walking in the bus center aisle. The corners on the guard are rounded so that when the platform is rotated, no sharp edges will be swung around which might otherwise injure nearby passengers. So far as the person on the platform is concerned, there is no relative movement between the guard and the platform thereby permitting the user to hang onto this guard during actuation of the lift.

Figure 8:
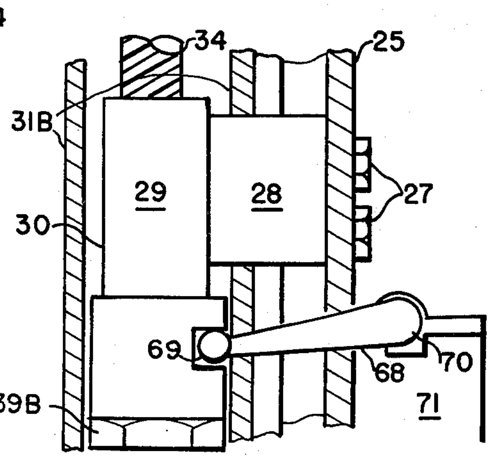
FIG. 8 is an enlarged partial view of the sensing mechanism for stopping actuation of the platform when it reaches ground level.

As pointed out before, it is necessary that the lift be lowered to ground level to enable the user to move off of the platform directly onto the ground. However the vehicle may stop at curbs or on level ground requiring that the platform be stopped at varying levels. For this purpose there is provided a stop mechanism to sense the stopping of downward movement of the platform and deactivate the motor 35 driving the vertical drive shafts 32 and 34. This mechanism is illustrated in FIG. 8 showing the ball nut 39B riding on the threaded shaft 34. The actuator arm 68 is fixed to the channel 25 supporting the platform. This arm includes an extending end 69 positioned adjacent but slightly spaced from the ball nut 39B with the opposite end rotatably fixed to a mount 70 fixed to the platform support. A switch 71 is mounted for actuation when the lever 68 is pushed downward.

In operation the ball nut is driven vertically up and down as the threaded shaft 34 is rotated. The support sleeve 29 rides on the ball nut carrying with it the platform as previously described. The switch 71 and actuator 68 being fixed to this support will ride up and down with the ball nut to maintain a fixed distance between the actuator and the ball nut. However if as the platform is being lowered it encounters an object such as a street curb further vertical movement is stopped. Continued rotation of the shafts 32 and 34 will move the ball nut further down away from the support sleeve 29. Such relative movement between the ball nut and the support sleeve will shift the ball nut into contact with the actuator 68 causing a downward movement thereof and a resulting actuation of the switch 71. This switch in turn will deenergize the motor 35 and apply the brake 81 stopping further rotation of the drive shafts 32 and 34.

Figure 7A:
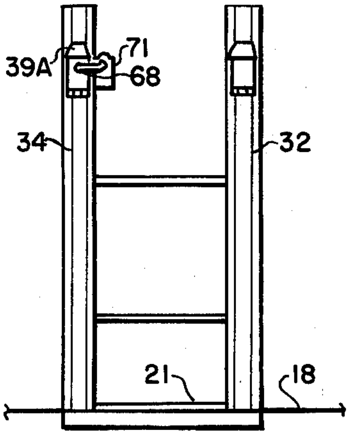
FIGS. 7A, 7B and 7C are schematic views of the lift apparatus showing the mechanism for stopping vertical actuation of the platform when it reaches ground level.
Figure 7B:
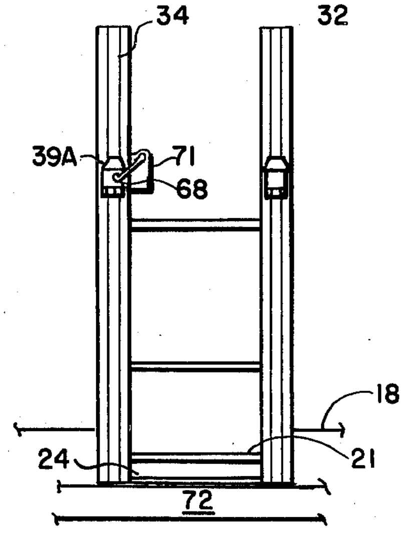
Figure 7C:
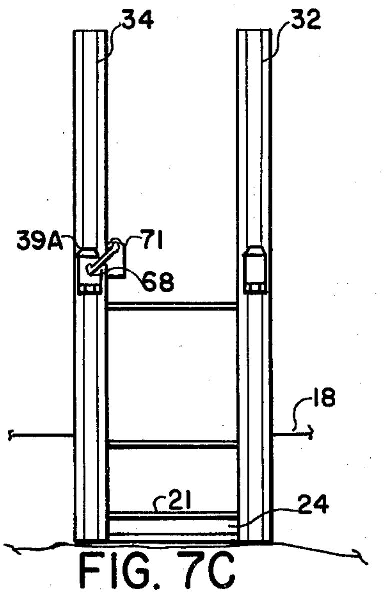

As illustrated in FIG. 7A, the drive shaft 34 is shown with the ball nuts 39A fixed thereto. The actuator 68 is spaced from the ball nut in the manner illustrated in FIG. 8. In FIG. 7C the platform 21 is shown spaced slightly above the support 24 since the platform itself has now contacted a curb 72 which prevents further downward movement. Under these conditions the switch 71 is actuated by the arm 68 being contacted by the ball nut 39B thereby shutting off the drive motor and preventing further downward movement of the platform support. Since the platform is held on the support 24 by the stud 46 sufficient vertical movement between the platform and the support arm 28 can occur to permit actuation of the switch 71.

To explain the mode and sequence of operation of the apparatus just described, the various limit switches and actuators are shown primarily in FIG. 4. Of course in the usual passenger bus installation the overall system will be initiated by a master control switch (not shown) under control of the bus driver. The operation of the lift system is initiated by the user pushing a control switch 74 on the console 50. In the usual operation this switch must be held against a spring tension by the user for the continued operation of the lift. Also in parallel connection with this switch is a driver-operated switch which enables actuation of the lift to enable a person to board and disembark the bus.

With the platform in the stowed position and immediately following actuation of the switch 74, an air valve 75 is activated allowing air from the air tank 76 to flow through the line 76' to operate the actuator 58 and open the forward door 57. This air tank is maintained in a pressured condition by a compressor (not shown) driven by the vehicle drive unit. Actuation of the passenger switch 74 also causes the valve 78 to actuate the air cylinder 56 to raise the ramp and the corner flap 48 until the ramp is substantially horizontal with the platform and the flap is in the vertical position. Such action permits the platform to clear the edge of the well during rotation and also prevents any wheelchair on the platform from rolling therefrom during movement of the lift. In addition the limit switch 77 can be used to cause the setting of the brake-accelerator interlock on the vehicle (not shown). This interlock sets the bus brakes and prevents further movement of the bus during operation of the lift. While this brake-accelerator interlock is not shown, they are commonly provided on public vehicles to prevent acceleration of the conveyance while the rear door is open.

With the opening of the forward door 57 the limit switch 77 is operated to energize and cause the actuation of the valve 79 to move the cylinder 45 and rotate the platform outward to a position facing normal to the side of the vehicle and at the same time open the rear door 61. With the platform rotated to this position the arm of the limit switch 80 is shifted causing the motor 35 to be energized to drive the screw shafts 32 and 34 in the direction for initiating downward travel of the platform. When the platform reaches a position which is a few inches above the height of an average street curb, a brake 81 acting on the screw shaft 32 is set by a limit switch 82 to slow this downward travel. The brake continues to be set but the motor is deenergized, stopping the platform when the control switch 74 is released by the user.

If the platform strikes an object prior to being stopped by the user, downward travel will be stopped so as to cause movement of the arm 68 thereby tripping the switch 71 to turn off the motor 35 and set the brake 81. When the motor 35 is stopped the valve 78 is energized by the switch 71 to cause shifting of the cylinder 56 so as to lower the flap 48 if the platform has moved sufficiently to actuate a limit switch 82. If the flap or ramp rather than the platform hits an object, they will be rotated upward by the object to actuate a limit switch 84 to cause the motor 35 to stop and the brake to come on. Also the valve 78 causes extension of the cylinder 56. At this time the user can either move off the ramp or if the ramp is in a position unsuitable for the discharging or boarding of a passenger, it can be raised again for movement of the bus to a position whereby the platform can be properly positioned for movement of the passenger.

Movement of the ramp and flap from the lower to the upward position is initiated by actuation of the switch 74. This energizes the motor 35 to rotate the screw shafts in the direction for driving the support 24 upward carrying with it the platform 21. When the platform initiates upward movement, the limit switch which stopped the downward travel (either the limit switch 71 or 84) is released. As the platform travels to the raised position at the passenger level, the limit switch 85 is actuated causing the motor 35 to be denergized and setting the brake 81. Thereafter the valve 79 is shifted causing the air cylinder 45 to rotate the platform and the rear door inward. After the platform reaches the inward position, the limit switch 80 is shifted actuating the valve 75 to cause the air cylinder 58 to close the forward door. The limit switch 80 also shifts valve 78 to actuate the air cylinder 56 thereby lowering the ramp and flap so that the user can move from the now stationary platform. With this action the brake/accelerator interlock is released allowing the driver to initiate forward drive motion of the vehicle.

Figure 10:
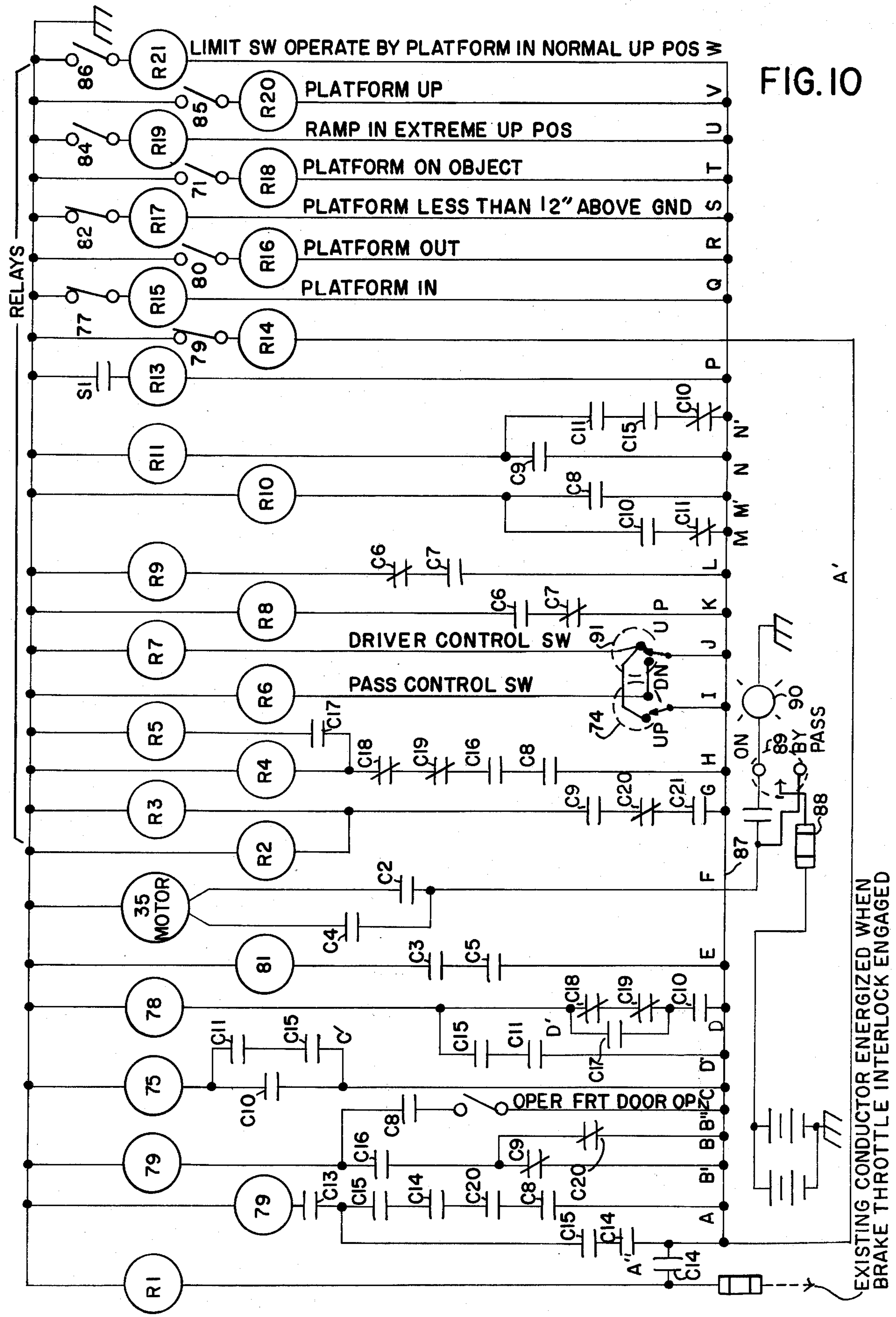
FIG. 10 is an electrical schematic of the control for the lift apparatus.

Shown in FIG. 10 is one embodiment of an electrical control schematic for the lift previously described. Shown therein are the controls for actuation of the air valve 75 regulating the actuator 58 for the forward lift door, the air valve 78 for regulation of the console-mounted actuator 56 which raises and lowers the ramp 48 and the flap 48A, and the air valve 79 which regulates the actuator 45 for rotating the platform on the lift. In addition there are incorporated the following limit switches: limit switch 71 for detecting relative movement between the ball nut 39B and the threaded shaft 34, limit switch 77 for detecting the forward door being in the open position, limit switch 80 for detecting the platform being rotated to the position facing out from the bus, limit switch 82 for detecting when the platform reaches a predetermined point in its downward movement, limit switch 84 for detecting when the ramp or flap strikes an object during its downward travel, limit switch 85 for detecting the arrival of the platform at the raised or passenger level position and limit switch 86 for sensing that the ramp and flap are raised to their normal up position. In addition the relays are designated with an "R" prefix and the contacts actuated by each relay have a "C" prefix and a suffix number identical to that of the controlling relay.

Thus as shown in FIG. 10 the conductor 87 is connected to the existing vehicle system through a fuse 88 and a master switch 89 controlled by the vehicle operator. When the power to the system is turned on an indicator lamp 90 is energized. Thus each of the air valves 75, 78 and 79, the lift brake 81, the motor 35 and the limit switches 71, 77, 80, 82, 84, 85 and 86 are connected in circuits to sequence the operation of the lift or to sense ay abnormal condition so as to stop or reverse actuation of the lift for the safety of the passenger. The operation of this control will be described in various sequences for movement of the lift from one position to another under control of either the driver or the passenger.

STEADY STATE CONDITION OF LIFT a. The limit switch 77 is open since the forward door 57 normally is closed.
b. Contact C 14 is deenergized since the limit switch 77 is open.
c. Contact C 1 is eeenergized since contact C14 of line A'' is open.
d. Air valve 79 is energized to hold the platform in since the contact C14 of line A' is closed.
e. The limit switch 80 of line Q is open since the platform is rotated to the "in" position.
f. The limit switch 80 of line R is open since the platform is not rotated outward.
g. The limit switch 82 of line S is closed.
h. The limit switch 71 of line T is open.
i. The limit switch 84 of line U is open.
j. The limit switch 85 of line B is closed since the platform is in the "up" position.
k. The limit switch 86 of line B is open since the ramp is down.
l. The limit switch 79 is open since the lift door 57 is closed.
m. All other components and relays shown in the drawing are deenergized until the driver master switch 89 is activated.

ACTION-DRIVER MASTER SWITCH 89 IS TURNED ON a. Contact C1 is energized.
b. Relays R3 and R4 remain deenergized.
c. Relays R17 and R20 are energized.
d. Contacts C17 in lines D' and H' are closed.
e. Contacts C20 in lines G and B are open and contacts C20 in line A is closed.

ACTION — ENERGIZATION OF CONTROL TO MOVE LIFT FROM PASSENGER-LEVEL POSITION TO THE GROUND-LEVEL POSITION

For operation of the lift from the position inside the bus to the lower position actuation of either the passenger control switch 74 or a parallel connected driver control switch 91 is necessary. Once either of these switches is operated the following sequence occurs:

a. Relay R6 is energized opening contact C6 in line L and closing contact C6 in line K.
b. Relay R8 is thereby energized closing contacts C8 in lines M', H and B'', energizing relay R10 which closes contacts C10 in lines M, D and C and opens contact C10 in line N'. Contact C8 in line A is opened.
c. Air valve 78 is energized by the closing of contact C10 in line D, causing the ramp to be raised which in turn closes the limit switch 86. Relay R21 is energized and contacts C21 in lines G and B are closed.
d. Air valve 75 is energized to open the forward door 57 since contact C10 of line C is closed.
e. The forward door 57 opens closing the limit switch 77 in line A' to deenergize relay R14 thereby closing contacts C14 on lines A and A'' and opening contacts C14 in line A'.
f. As the forward door opens completely, limit switch 77 in line B'' is closed to energize air valve 79 and move the platform out.
g. With movement of the platform outward, the limit switch 80 in line Q is released, relay R15 is energized thereby closing contacts C15 in lines N', D'' and C' and opening the contact C15 in line A'.
h. As the platform reaches the full rotated position limit switch 80 in line R is closed and relay R16 is energized thereby closing contacts C16 in lines H and B to energize the relays R4 and R5.
i. Contact C5 of line E is opened to release the brake 81 and simultaneously, contact C4 of line F' is closed to energize the motor 35 to move the support down.
j. As the platform travels down, the limit switch 85 is released to an open position thereby deenergizing the relay R20 closing the contact C20 in lines G and B and opening the contact C20 in line A.
k. As the platform continues downward travel at a predetermined distance above the ground, the limit switch 82 is opened and the relay R17 is deenergized thereby opening contacts C17 in lines H' ad D', deenergizing relay 5 to close contact C5 in line E and set the brake 81 which acts to slow downward travel of the platform.
l. As the platform continues downward motion either the limit switch 71 or 84 will be actuated by the platform or the ramp, respectively striking the ground or the curb.
   1. If the limit switch 71 is actuated the relay R18 is energized to open the contacts C18 in lines H and D, thereby deenergizing relay R4 and the air valve 78. As a result, the contact C4 in line F' opens and the motor 35 stops, and the air valve 78 is caused to lower the ramp 48.
   2. If the limit switch 84 is actuated, the relay R19 is energized opening the contacts C19 in lines H and D to deenergize relay R4 and the air valve 78 thereby stopping the motor and lowering the ramp.
m. As an alternate to (*k*) above, if the platform or the ramp hits an object during its travel downward and before actuation of the limit switch 82, the following sequence occurs with relay R17 being energized at this time.
   1. If the platform hits an object, the limit switch 71 is closed and the relay R18 is energized thereby opening the contacts C18 in lines H and D. The relay R4 is deenergized thereby opening the contact C4 in line F' to stop the motor 35. Also the relay R5 is deenergized to close the contact C5 in line E and set the brake 81 to stop movement of the platform.

2. If the ramp hits an object, the limit switch 84 is closed and the relay R19 is energized to open contacts C19 in lines H and D. Thus relay R4 is deenergized to open contact C4 in line F' to deenergize the motor 35. Simultaneously the relay R5 is deenergized to close contact C5 in line E and set the brake 81 to stop movement of the platform. Note that the contact C17 in line D' is still closed to maintain the ramp in the upward position.

n. If either the driver control switch 91 or the passenger control switch 74 is released at this time, the following conditions exist: Relay R6 is deenergized to open the contact C6 in line K and close contact C6 in line L. Relay R8 is deenergized to open contacts C8 in lines M', H and B'' and close contact C8 in line A.

Thus the lift is stationary in the "down" position ready for disembarking any passenger on the lift or receiving a passenger awaiting entry into the vehicle.

ACTION — ENERGIZATION OF CONTROL TO MOVE LIFT FROM THE GROUND-LEVEL POSITION TO THE PASSENGER-LEVEL POSITION

With the lift in the "down" position as previously described, actuation of either the driver control switch 91 or the passenger control switch 74 causes the following sequence to occur:

a. Relay R7 is energized to open the contact C7 in line K and close the contact C7 in line L.

b. Relay R9 is thereby energized to close contacts C9 in lines G, N and A and open the contact C9 in line B'.

c. Relay R11 is energized to close the contact C11 in lines N', D'' and C' and open contact C11 in line M which deenergizes relay R10 and opens contacts C10 in lines M, D and C and closes contact C10 in line N'.

d. The closing of contact in C11 in D' causes air valve 78 to energize for raising the ramp 48, closes the limit switch 86, energizes the relay R21 and closes contacts C21 in lines G and B.

e. Relay R2 and relay R3 are thereby energized to open contact C3 in line E and release the brake 81, and also close contact C2 in line F to energize the motor 35 for moving the platform upward.

f. As the platform travels upward the limit switch 82 is released, thereby energizing the relay R17 to close contacts C17 in lines H' and D'.

g. When the platform reaches the upward position the limit switch 85 is closed, relay R20 is energized to open contacts C20 in lines G and B and close contact C20 in line A.

h. Relay R2 and relay R3 are thereby deenergized to close contact C3 in line E and set the brake 81, and open contact C2 in line F to deenergize the motor 35. The air valve 79 is also released by the opening of contact C20 in line B.

i. In addition contact C20 in line A causes the air valve 79 to be energized and rotate the platform to the inward position.

j. As the platform is rotated inward, the limit switch 80 in line R is released, the relay R16 is deenergized thereby opening contacts C16 in lines H and B.

k. When the platform has rotated to the full in position, the limit switch 80 in line Q is opened to deenergize the relay R15 and open contacts C15 in lines N', D'' and C' and close contact C15 in line A'.

l. The air valve 78 is thereby deenergized causing the ramp to be lowered and releasing the limit switch 86 to deenergize the relay R21 and open contacts C21 in lines G and B.

m. Simultaneously the air valve 75 is deenergized to actuate the forward door to the closed position. As the forward door begins to close, the limit switch 77 in line B'' is opened.

n. When the forward door 57 has closed, the limit switch 77 in line A' is closed to energize relay R14 and close the contacts C14 in lines A and A'' and open the contact C14 in A'.

o. When either the driver control switch 91 or the passenger control switch 74 is released the platform is now in the original stowed condition described heretofore.

Thus it can be seen that operation of the lift either from the "up" position to the "down" position or vice-versa is completely automatic once initiated. In addition various safety factors are provided for detecting conditions which might affect the safety of the passenger and which serve to cease further operation of the lift.

The invention claimed

1. A lift for transporting passengers between ground level and passenger level and into and out of the vehicle, said vehicle having a well therein communicating with an opening in one wall to form an entrance into the vehicle, said well being defined by an opening in the floor of said vehicle, said lift comprising, in combination:

a platform having a horizontal top surface on which a passenger can ride and also being large enough to support a conventional wheel chair, said platform being of larger size than said well;

a support for said platform;

means fixing said platform to said support for pivoting movement of said platform about a pivot and between a first position situated completely within the vehicle and covering said well and a second position turned substantially normal to said first position in which said platform occupies the space in the well and extends through and beyond said wall opening of the vehicle;

first actuating means for rotating said platform between the first and second positions; and second actuating means for moving said support vertically between the passenger level and the ground level positions whereby the platform can be lowered below said floor when in said second position and raised above the floor and pivoted to said first position within the vehicle.

2. A lift as defined in claim 1 wherein said pivot for the platform is located approximately midway along one side of said platform.

3. A lift as defined in claim 2 including a ramp having a planar top surface;

means pivotally connecting said ramp to the edge of said platform that faces outward from the vehicle when the platform is in the second position; and means to pivot said ramp between a first position with the top surface in the plane of the platform top surface and a second position wherein the top surface at the extended edge spaced from the pivotally connecting means is lower than the plane of the platform top surface.

4. A lift as defined in claim 3 wherein a portion of one corner of the platform and ramp extending from the edge of the platform facing into the vehicle when the platform is in the first position to the edge of the ramp facing out of the vehicle when the platform is in the second position is truncated;

a flap positioned in the truncated corner of said platform and ramp and having a planar top surface; and means pivotally connecting the adjacent edges of the flap and the truncated edge of the ramp.

5. A lift as defined in claim 4 including means to actuate said flap from a first position having the top surface thereof in the plane of the platform to a second position with the top surface extending vertical above the platform.

6. A lift as defined in claim 5 including a guard fixed to the edge of said platform opposite the edge to which said ramp is attached for blocking passage into the well from the vehicle when the platform is pivoted to said second position.

7. A lift as defined in claim 6 including switch means fixed to said platform in a position to be actuated by a passenger positioned on the platform; and means energizing said first and second actuating means in response to actuation of the switch.

8. A lift as defined in claim 7 including means for sensing contact between the support and platform and the ground when the platform is moved from the passenger level position towards the ground level position for deenergizing said second actuating means and stopping vertical movement of the platform.

9. A lift as defined in claim 8 including closure means for closing the opening in the side wall of said vehicle when the platform is in the first position.

10. A lift as defined in claim 9 including actuating means for opening said closure means as the platform is pivoted from the first to the second position.

11. A lift as defined in claim 10 wherein said closure means includes a pair of doors, one hinged to each vertical edge of said vehicle side wall opening.

12. A lift for transporting passengers as defined in claim 1 including:

means for sensing contact between the platform and the ground as the platform is moved from the passenger level to the ground level for deenergizing said second actuating means upon contact with the ground.

13. A lift for transporting passengers as defined in claim 12 including control means for allowing energization of the second actuating means only when the platform is in the second position.

14. A lift for transporting passengers as defined in claim 13 including a ramp pivotally connected at one edge to the adjacent edge of the platform which extends from the vehicle when the platform is in the second position.

15. A lift for transporting passengers as defined in claim 14 wherein said ramp is pivotable from a first position extending in the plane of said platform top surface to a second position wherein the edge opposite the edge pivotally connected to the platform extends below the platform level; and means for pivoting the ramp to the second position when the platform reaches the ground level position.

16. A lift for transporting passengers as defined in claim 12 including means for signaling when the platform strikes an immovable object as it moves from the passenger level to the ground level; and means acting responsive to signaling by said signaling means for deenergizing said second actuating means when an immovable object is contacted by the platform.

17. A lift for transporting passengers between ground level and passenger level and into and out of a vehicle, said vehicle having a well therein communicating with an opening in one side wall to form an entrance into the vehicle, said well being defined by an opening in the floor of said vehicle, said lift comprising, in combination:

a platform having a horizontal top surface on which a passenger can ride;

a support for said platform;

means fixing said platform to said support for pivoting movement of said platform about a pivot and between a first position situated completely within the vehicle and a second position turned to partially extend from said well out through the side wall opening in said vehicle;

first actuating means for rotating said platform between the first and second position; and second acutating means for moving said support vertically between the passenger level and the ground level, a pivoted ramp connected to the outermost edge of said platform in the second position and a flap which forms a truncated corner of said ramp pivoted to said ramp, said flap being folded up on said ramp in order to clear any obstruction or part of the vehicle near one corner of the well as said platform is pivoted from the first position to the second position.

* * * * *